Dec. 8, 1964 W. M. ALLEN ETAL 3,159,868
APPARATUS FOR PEELING SAUSAGES AND THE LIKE
Filed Sept. 8, 1960 6 Sheets-Sheet 1

Fig. 1

INVENTORS
WILLIAM M. ALLEN
CHARLIE W. FICK
ALBERT M. ROCKWOOD
ROBERT E. BELL
BY
Gray, Mase and
Dunson, Attorneys Dec. 8, 1964  W. M. ALLEN ETAL  3,159,868
APPARATUS FOR PEELING SAUSAGES AND THE LIKE
Filed Sept. 8, 1960  6 Sheets-Sheet 5

INVENTORS
WILLIAM M. ALLEN
CHARLIE W. FICK
ALBERT M. ROCKWOOD
ROBERT E. BELL
BY Gray, Mase and
Dunson, Attorneys Dec. 8, 1964   W. M. ALLEN ETAL   3,159,868
APPARATUS FOR PEELING SAUSAGES AND THE LIKE
Filed Sept. 8, 1960   6 Sheets-Sheet 6

INVENTORS
WILLIAM M. ALLEN
CHARLIE W. FICK
ALBERT M. ROCKWOOD
ROBERT E. BELL
BY Gray, Mase and Dunson, Attorney United States Patent Office 3,159,868
Patented Dec. 8, 1964

3,159,868
APPARATUS FOR PEELING SAUSAGES
AND THE LIKE
William M. Allen, Charlie W. Fick, and Albert M. Rockwood, Columbus, and Robert E. Bell, Worthington, Ohio, assignors, by mesne assignments, to Hoover Ball and Bearing Company, Saline, Mich., a corporation of Michigan
Filed Sept. 8, 1960, Ser. No. 54,630
16 Claims. (Cl. 17—1)

This invention relates to the manufacture of skinless sausages. More particularly, it is concerned with the means of removing the casing or skin from a plurality of connected sausage links.

In the manufacture of skinless sausages or frankfurters, a comminuted meat mixture is packed or stuffed into a predetermined length of a suitable sausage casing, which is formed of cellulose film or similar material and then divided into a plurality of individual sausages or links of uniform length, generally by constricting a small section of the casing at suitable intervals. The length of links is then processed by cooking, smoking and cooling, or other treatment necessary to prepare the product for the market, after which the casing is removed from the individual links. If the casing is removed by hand, the operation becomes time-consuming, costly, and unsanitary. Consequently, a number of casing-stripping or peeling machines have been developed and are well known in the art.

Conventional machines for peeling the casings from sausages usually carry out such operations as slitting the casing longitudinally or handling the frankfurter in such a way as to frequently cut, or otherwise mar, the product itself. Other devices use the additional and costly step of inflating the casing with air under pressure to separate the casing from the meat so as to produce a space between the casing and the meat for the knife to enter and cut the casing.

One embodiment of the apparatus of this invention comprises a plurality of disks on which are mounted a plurality of rollers adapted to contact and roll upon the surface of a stripper plate, and includes a plurality of cutters supported by the disks, the cutters being adapted to precede the rollers and cut off the sausage casing immediately prior to the sausage being squeezed out by the rollers.

Another embodiment of the peeling apparatus includes a plurality of roller chains arranged in opposing pairs having a plurality of peeler blocks and sausage holders mounted on one chain of an opposing pair of chains and a pusher block and plurality of sausage holders mounted on the opposite chain of the opposing pair. Each of the peeler blocks has a casing holder or clamp bar and a casing cutter or knife. The sausage passes between the opposing chains and, after the end of the casing is cut, the pusher block enters the constriction between the ends of two sausages, and one of the sausages is pushed out of the casing through the cut end, since the chain supporting the pusher block moves faster than the chain supporting the peeler block. The empty casing is then severed from the remaining string of sausage links so that the operation may be repeated.

Still another embodiment of the apparatus is comprised of a knife which severs the casing at each end of the sausage to remove the casing-wrapped sausage from a first conveyor, a second conveyor to receive and carry the casing-wrapped sausage to a pair of rollers positioned with their longitudinal axis parallel to each other and turning in opposite directions, the rollers being arranged to roll against one another. The casing is drawn through the rollers stripping it from the sausage which is too large to pass between the rollers.

In the preferred form of the apparatus, the sausages are introduced into the peeler by a conveyor or other means. The means for introduction of sausage links into the peeler, and the means for severing the casing and stripping the casing from the sausage, are synchronized to provide a continuous operation. Thus, if a machine is used to produce the sausages, the sausages may be peeled as fast as they are produced from the machine.

One advantage of the peeling apparatus is that the casing is removed from a comminuted food product, such as a string of sausages or frankfurters, quickly, cleanly, and without marring the product itself.

Another advantage is the provision of a frankfurter skinning device where manual handling of the product is unnecessary.

Still another advantage of the peeling apparatus of this invention is that the apparatus may be associated with a sausage producing machine and properly timed therewith to remove the sausages for peeling in a positive manner from the sausage producing machine.

To these and other ends, this invention comprises apparatus, a preferred form of which is disclosed in the following description and attached drawings. Although the apparatus and structure described and shown in detail refer with particularity to a frankfurter peeling device, it is apparent that this invention should not be limited thereto. The invention is applicable to peeling mechanisms of all types, when properly constructed to utilize the advantages of this invention. The invention may be used for other purposes where its features are advantageous.

Figure 1:
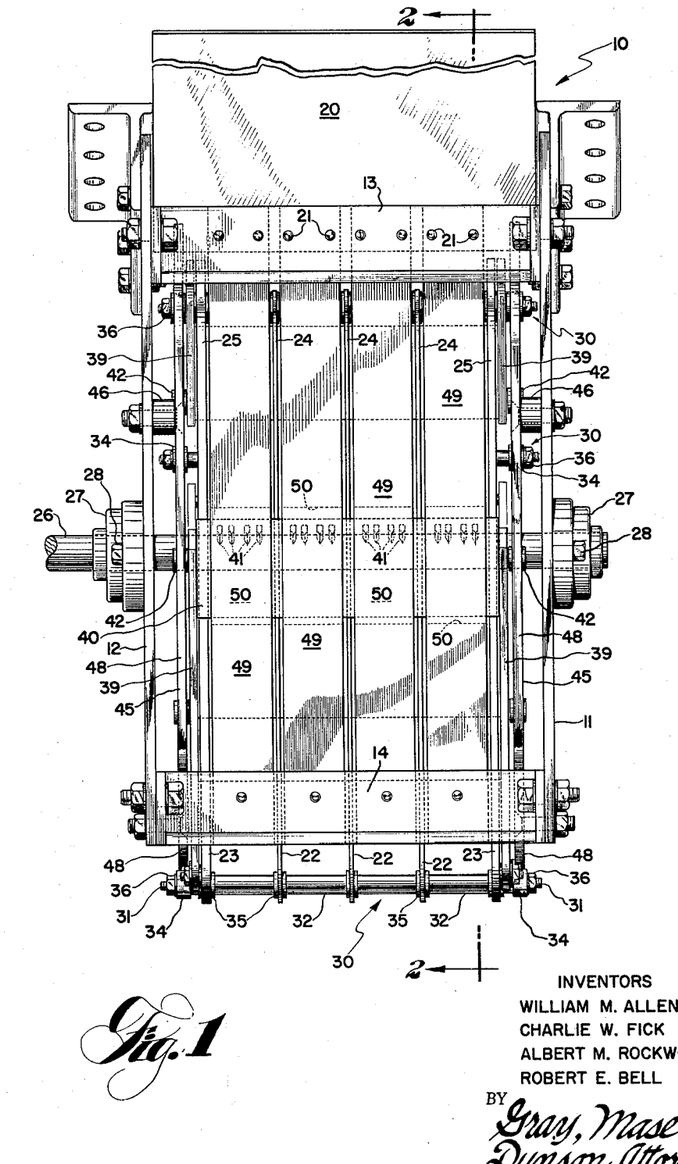
FIG. 1 is an elevational view of one embodiment of the peeler apparatus.
Figure 2:
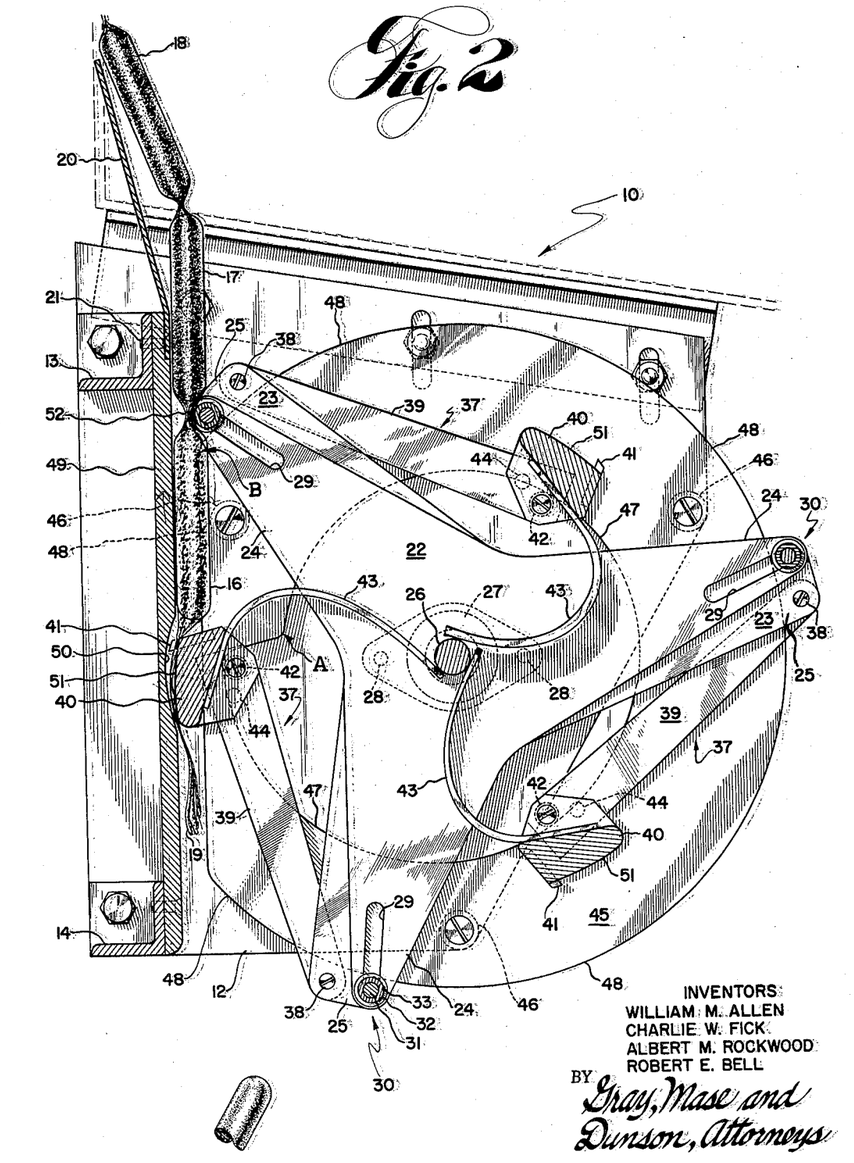
FIG. 2 is a sectional elevational view of the peeler taken along the lines 2—2 of FIG. 1.

Referring to FIGS. 1 and 2, the peeling device 10 is adapted to receive and peel four links of linked sausages simultaneously, although it will readily be seen that this number may be varied considerably and four is chosen for convenience of description. The peeling device has frame members 11, 12, 13, and 14. A plurality of lengths of sausage links, an example of which is shown by a length of sausage links comprised of sausages 16, 17, and 18, with the enclosing casing 19, is introduced into the machine by a suitable conveyor (not shown) which is synchronized with the action of the peeling mechanism. The length of sausages passes over a guide plate 20 which is attached to frame member 13 by suitable means such as bolts 21—21.

A number of disks or spider plates 22—22 and 23—23, each having an equal number of projecting arms or spider arms 24—24 and 25—25, respectively, are fixedly mounted on shaft 26 which is in turn rotatably mounted in bearings 27—27. Bearings 27—27 are attached to frame members 11 and 12 by bolts 28—28. Spider plates 22—22 and 23—23 are spaced apart from each other along shaft 26 at a distance slightly in excess of the width of a sausage or the product undergoing peeling. In the embodiment of the invention shown in FIGS. 1 and 2, each of spider plates 22—22 and 23—23 has three spider arms 24—24 and 25—25, respectively, spaced 120 degrees apart. Near the extremity of each of arms 24 and 25 is a slot 29. Arms 24—24 and 25—25 are aligned so that roller assemblies 30—30 pass through slots 29—29 and are free to move back and forth in slots 29—29. Each roller assembly 30 consists of a rod 31 inserted through rollers 32—32, 33—33, and cam rollers 34—34 separated by spacers 35—35. Rollers 33—33 are between spacers 35—35 and can be seen only in FIG. 2. Rods 31—31 are held in place by nuts 36—36 threadedly attached to each end of rods 31—31. Spider arms 25—25 of the two outside spider plates 23—23 are wider at their extremities so that cutters 37—37 may be pivotally mounted by bolts 38—38 passing through cutter arms 39—39.

Figure 3:
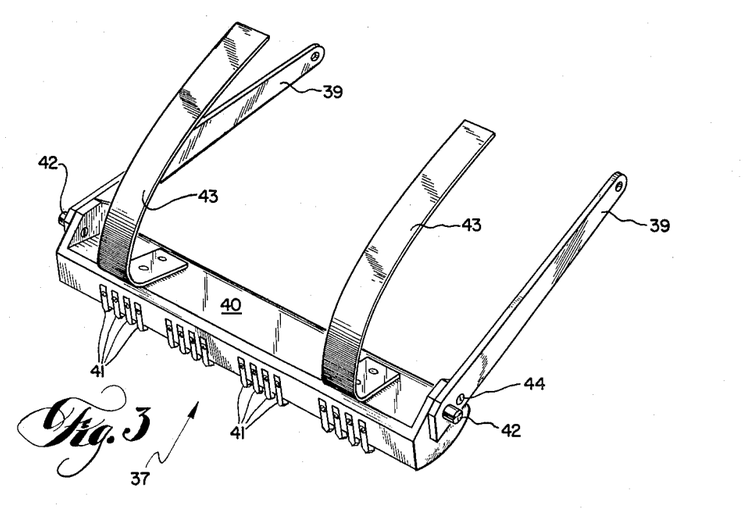
FIG. 3 is a perspective view of the cutter of the embodiment of the peeler shown in FIG. 1.

Referring to FIG. 3, each cutter 37 is comprised of cutter arms 39—39, a stripper bar or knife support 40, knives 41—41, rollers or cam followers 42—42 and springs 43—43. Knife support 40 is fixedly attached to cutter arms 39—39 by suitable means such as bolts 44—44.

Two double surface cams 45—45 are fixedly attached to frame members 11 and 12 and are spaced therefrom by spacers 46—46. On each double surface cam 45, an internal cam surface 47 is provided for contact with the rollers or cam followers 42—42 of the cutters 37—37 and an external cam surface 48 is provided for contact with the rollers or cam followers 34—34 of the roller assemblies 30—30.

Spider plates 22—22 and 23—23 are rotated by power means (not shown) applied to shaft 26. Rollers 42—42 of cutters 37—37 are pushed against the internal cam surfaces 47—47 by springs 43—43. When rollers 42—42 reach point A on cam surfaces 47—47, the cutter is pushed by springs 43—43 towards stripper plate 49 attached to frame members 13 and 14. Stripper plates 49—49 are spaced so that the ends of spider arms 24—24 can pass between them. Cutter 37 strikes casing 19 just in front of the leading end of frankfurter 17 as it passes through the peeler. Casing 19 is pressed against stripper plates 49—49 and knives 41—41 penetrate the casing and pass into knife reliefs 50—50 provided on stripper plates 49—49. Knives 41—41 make a number of vertical slits across casing 19, so that the smooth surface 51 of the stripper bar and knife support 40, which is applying pressure to casing 19 below the vertical slits, pulls the cut casing away from the casing proper. In the embodiment of the invention shown in FIGS. 1, 2, and 3, knives 41—41 operate without having the sharp surfaces contact other metal due to provision of knife reliefs 50—50; consequently they seldom, if ever, need sharpening.

Almost simultaneously with the action of cutter 37, rollers 32—32 enter the constriction 52 of casing 19 between frankfurters 16 and 17. As cam followers 34—34 pass over point B of external cam surfaces 48—48, rollers 32—32, which are moving faster than the frankfurters, press between the sausages and against stripper plates 49—49. Movement of the roller assemblies 30—30 changes from circular to linear at point B paralleling the surface of stripper plates 49—49 and squeezing the frankfurters from the casing. It will be seen that, due to the tapered ends of the frankfurters, the rollers 32—32 need not necessarily be perfectly timed so as to strike the exact center of the constriction 52. If, for example, the rollers 32 were to strike the lower end of frankfurters 17, frankfurters 17 would be pushed slightly backward as the roller would enter and seat itself in the constriction 52. Roller assemblies 30—30 are allowed to move toward the center of spider plates 22—22 and 23—23 in the slots 29—29 of the spider arms 24—24 and 25—25. Freedom of movement is facilitated by provision of rollers 33—33 between the rods 31—31 and spider arms 24—24 and 25—25.

As the frankfurters and lengths of casing fall from the peeler, a jet of air may be used to remove or separate the empty casings from the frankfurters, blowing the lighter casings away from the frankfurters.

Figure 4:
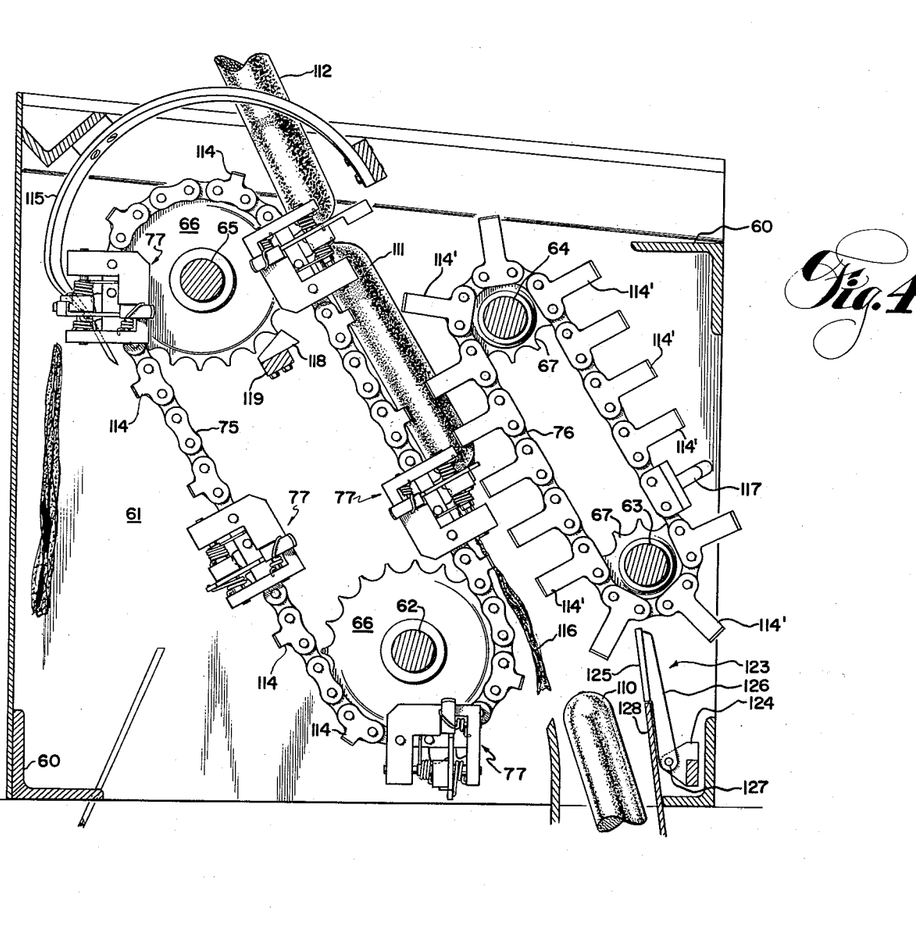
FIG. 4 is a partially sectional elevational view of another embodiment of the peeler apparatus.

The embodiment of the peeling device shown in FIG. 4 is comprised of frame 60 and side plates 61. Mounted on four axles 62, 63, 64, and 65 are sprocket wheels 66—66 and 67—67. The axles 62, 63, 64, and 65 are rotatably mounted in the side plates 61 by suitable means, such as bearings (not shown). Each set of sprocket wheels 66—66 and 67—67 supports lengths of roller chains 75 and 76 which have their ends connected to form loops. Sprocket wheels 66—66 on axles 62 and 65 support roller chain 75 and sprocket wheels 67—67 on axles 63 and 64 support roller chain 76. There may be a plurality of sprocket wheels 66—66 placed parallel to each other on each axle 62 and 65, and a plurality of sprocket wheels 67—67 placed parallel to each other on each axle 63 and 64 so that a plurality of roller chain loops may be placed parallel to each other. The roller chain 75 suspended on sprocket wheels 66—66 of axles 62 and 65 supports the peeler block 77 shown in FIG. 5.

Figure 5:
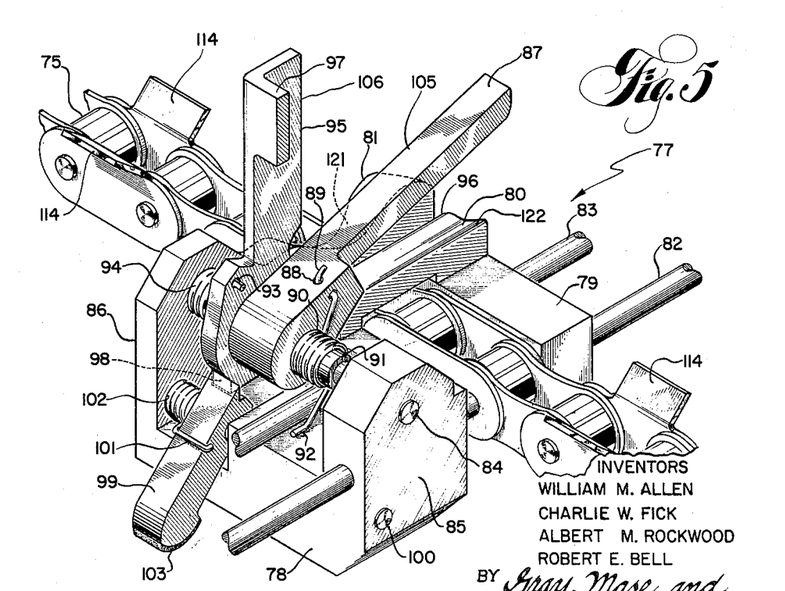
FIG. 5 is an enlarged perspective view of one of the peeler block assemblies of the embodiment of the peeler shown in FIG. 4.

Referring to FIG. 5, the peeler block 77 is comprised of a clamp and knife holder 78 and a side plate 79 attached together by a front crossbar 80 and a saddle-shaped rear crossbar 81 with rods 82 and 83 passing through the clamp and knife holder 78 and side plate 79 so that the peeler block assembly 77 may be mounted upon the roller chain 75. A clamp bar 105 and knife 106 are pivotally mounted on a rod 84, the rod 84 being mounted with its long axis perpendicular to the rods 82 and 83 and attached to the ends 85 and 86 of the clamp and knife holder 78. Clamp bar 105 is provided with a projecting arm 87 constructed to bear against the front crossbar 80. A hole 88 is provided in the clamp bar 105 to receive one end 89 of a spring 90 which encircles a hub 91. The other end 92 of the spring 90 bears upon the clamp and knife holder 78 so that the spring 90 provides the force to keep the arm 87 against the front crossbar 80. The knife 106 is also provided with a hole 93 to receive the end of a spring 94 which acts in a manner similar to that of spring 90; that is, the knife is forced in the same direction as the clamp bar 105 so that the knife edge 95 passes along the edge 96 of the front crossbar 80. The lateral projection or catch 97 engages the arm 87 of the clamp bar 105 preventing the knife 106 from pivoting further. The mounting portion of knife 106 is also provided with a projection 98 which is engaged by knife latch 99 pivotally mounted on rod 100. Rod 100 has its longitudinal axis perpendicular to the rods 82 and 83 and passes through to the ends 85 and 86 of the clamp and knife holder 78. A spring 102 encircles rod 100 and one end 101 is hooked over the latch so that the latch 99 is pivoted to engage the projection 98 of knife 106. When a force is applied to the hardened surface 103, so that the latch 99 is pivoted against the force of spring 102, the latch 99 is disengaged from the projection 98 of knife 106 and knife 106 is pivoted, due to the action of spring 94.

Rods 82 and 83 which are used to mount the peeler block assembly 77 on roller chain 75 may be extended to pass through other peeler blocks mounted on parallel roller chains, so that the peeler may receive several strings of sausages at one time.

As shown in FIG. 4, the sausages 110, 111, and 112 enter the machine between the two sets of roller chains 75 and 76. On links of roller chain 75 which are not associated with the peeler blocks 77, there are mounted lateral projections 114 which are shaped to fit around the sausage and hold it in place on the roller chains. Roller chain 76 is also provided with similar projections 114'.

As the peeler blocks 77—77 move with roller chain 75 and pass around sprocket 66 of axle 65, a Stellite boss on the end of arm 87 of clamp bar 105 contacts a cam 115. Cam 115 is shaped so that as each peeler block 77 continues to move with roller chain 75, clamp bar 87 is lifted from its contact with front crossbar 80 so that when the end of cam 115 is reached clamp bar 105 has been pivoted 90 degrees from its position of contact with front cross bar 80. Pivoting the clamp bar 105 also pivots knife 83, since catch 97 is engaged with clamp arm 87. When both clamp bar 105 and knife 106 have been pivoted 90 degrees, the projection 98 is engaged by latch 99 so that knife 106 is held in the pivoted position. When clamp bar 105 reaches the end of the cam 115, it is released to pivot toward front crossbar 80. At this point arm 87 comes to rest on casing 116 between the ends of the sausages 111 and 112. The casing is thus clamped firmly in place and the sausages are moved along with roller chain 75 through the peeling mechanism. It should be noted that, at the time arm 87 clamps the sausage casing 116 to front cross bar 80, the second roller chain 76 has not yet contacted the sausages. The peeler block assembly continues to move with roller chain 75 and the end 103 of latch 99 eventually contacts trip cam 118 mounted on trip cam support 119 attached to side plates 61. Tripping the latch 99 disengages its end from the projection 98 on knife 106 so that knife 106 pivots toward the casing and severs it between knife edge 95 and front crossbar edge 96.

The cupped shaped surface 121 of rear crossbar 81 and raised portion 122 of front crossbar 80 are provided to keep the ends of the sausages spaced as far apart as possible and to allow clamp bar 105 and knife 106 to enter the constricted space between the ends of the sausages. When latch 99 is tripped by cam 118, knife 106 severs the casing at the point of constriction. After the pusher block 117 enters between the ends of the two sausages and forces the lead sausages from the casing, the empty casing is retained in place by arm 87 of clamp bar 105. The casings are dropped from the peeler block assembly when the Stellite boss on clamp arm 87 contacts cam 115 on the reverse side of the loop of roller chain 75 raising clamp bar 105 from the front crossbar 80 and releasing the casing from its clamped position. The sausages, which have been forced from the casing, pass along between roller chains 76 and 75, exiting at the end of the peeler opposite the end of entry and drop on a conveyor, or into a container for packaging, etc.

The peeled sausages which are exiting from between roller chains 76 and 75 may have some tendency to turn and follow roller chain 76. For this reason, a deflector arm 123 is provided, which extends between the two side plates 61, and is mounted on suitable brackets 124. The deflector arm is comprised of a flat plate 125 which extends between side plates 61 and extending from plate 125 are two arms 126 which are pivotally mounted through holes 127 at their base to brackets 124. A second flat plate 128 is provided below plate 125 on the deflector arm 123 which is fixedly mounted between side plates 61. Deflector arm 123 is allowed to pivot so that as pusher block 117 mounted on roller chain 76 follows around sprocket 67 of axle 63, it contacts the deflector arm and pushes it backwards. Then, when the pusher block 117 has passed the deflector arm, the deflector arm springs back in place to prevent the sausages from following around the roller chain 76.

Figures 6, 8, 9:
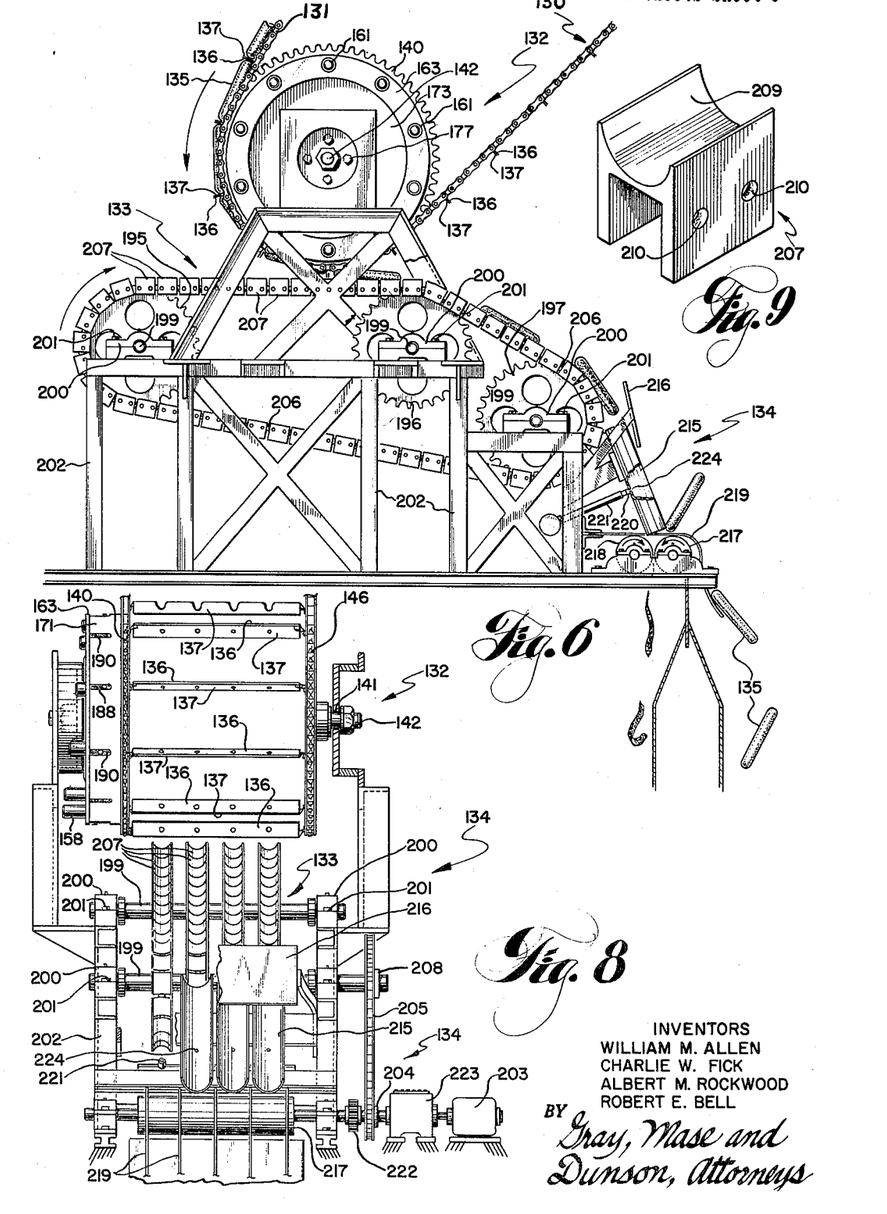
FIG. 6 is an elevational view of still another embodiment of the peeler apparatus.
FIG. 8 is an elevational view of the embodiment of the peeler shown in FIG. 6.
FIG. 9 is an enlarged perspective view of a sausage receptacle or tooth of the conveyor shown in FIGS. 6 and 8.

A third embodiment of the device is shown in FIGS. 6, 7, 8, 9, and 10. As shown in FIG. 6 a conveyor 130 consisting of roller chains 131—131 passes partially around a rotating cutter wheel 132 that cuts the casing between the sausages 135—135, allowing them to drop on a second conveyor 133. Conveyor 133 then carries the sausages 135—135 to a skinning device 134. Mounted upon roller chains 131, spaced at intervals about the length of a sausage 135, is a plurality of linkers or pairs of bars 136 and 137 having a small space between them.

Figures 7, 10:
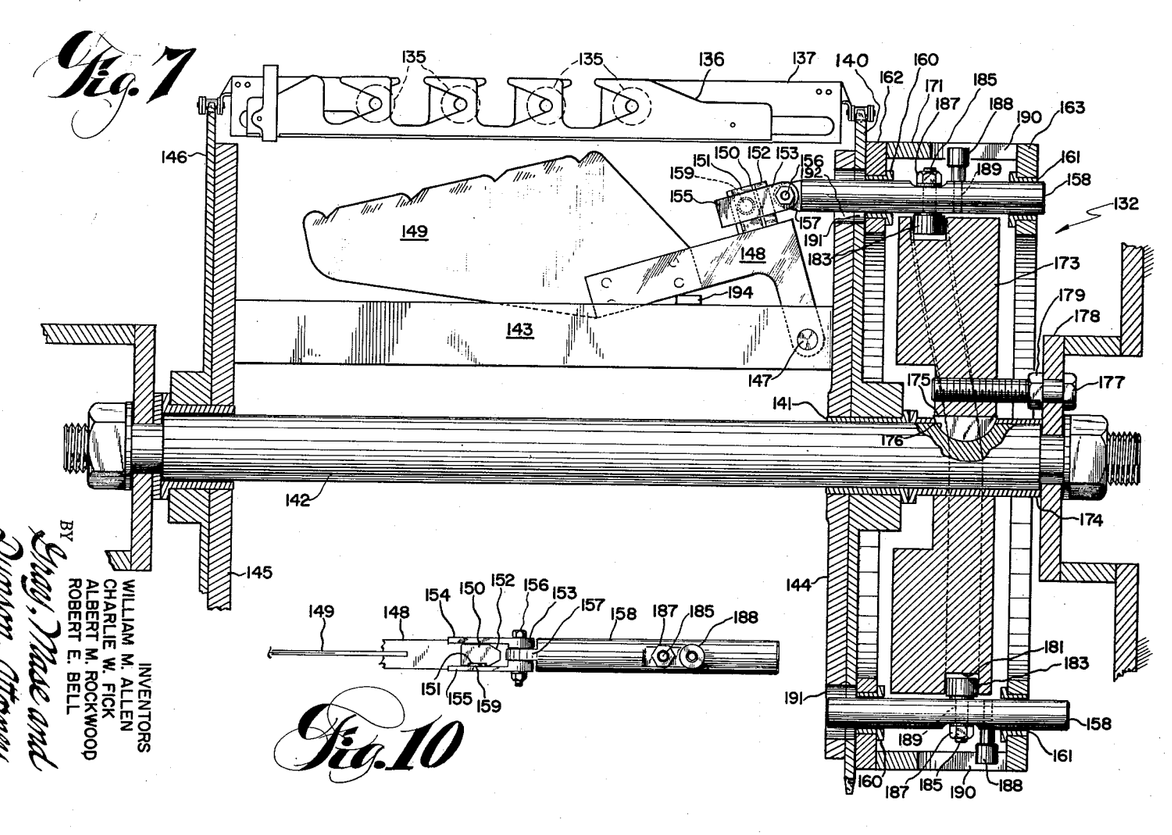
FIG. 7 is an enlarged sectional elevational view of the cutter wheel of the embodiment of FIG. 6 and taken along the lines 7—7 of FIG. 6.
FIG. 10 is an elevational view of a portion of the cutter wheel of FIG. 7.

Referring now to FIG. 7, sprocket wheel 140, rotatably mounted on bearing 141 affixed to axle 142, engages one of the roller chains 131 of conveyor 130 as it passes partially around the cutter wheel 132. A plurality of cross bars 143 (only one is shown in FIG. 7 for purposes of description) is suspended between and connected to plates 144 and 145. Plates 144 and 145 are bolted to sprocket wheels 140 and 146, respectively, and are adjustable radially with respect to sprocket wheels 140 and 146 for aligning the operating parts of the cutter wheel with the conveyor 130. Pivotally mounted by suitable means such as a pin 147 upon cross bar 143 is an L-shaped knife support or cutter arm 148 which supports cutter blade 149. Referring to FIG. 10, link 150 having a channel 151 and a tapered edge 152 is attached to cutter arm 148. Associated therewith is a spring release 153 comprised of cantilever springs 154, 155 fixed by suitable means, such as a bolt 156, to the end 157 of a rod 158. Spring clip 155 has a rounded node 159 that engages channel 151. Rod 158 is slidably mounted in bushings 160 and 161 that are in turn mounted in annular rings 162 and 163, respectively. Annular ring 162 is affixed to sprocket wheel 140 and is connected to annular ring 163 by means of cylinder 171. Positioned between the annular rings 162 and 163 is drum 173 mounted on a spacer 174 on axle 142. Spacer 174 and drum 173 are prevented from rotating on axle 142 by key 175 that passes through spacer 174 and fits into key slot 176 in axle 142. Drum 173 is laterally adjustable by rotation of bolt 177 threadedly engaged with drum 173. Bolt 177 passes through a hole in frame 178 and is prevented from accidental rotation by lock nut 179. Disposed around the periphery of drum 173 is cam groove 181 which engages cam roller 183 that is affixed to rod 158 by a bolt 185 passing through rod 158 and held in place by a nut 187. Rod 158 is provided with a second cam roller 188 affixed to rod 158 by a threaded portion 189. Cam roller 188 projects into slot 190 in cylinder 171. Sprocket wheel 140 and plate 144 are provided with openings 191 and 192, respectively, for passage of rod 158. Movement of the conveyor 130 causes rotation of sprocket wheels 140 and 146 due to their engagement with roller chains 131—131. Consequently, those parts which are attached to sprocket wheels 140 and 146 are also rotated. Bars 136 and 137 pass directly over cutter blade 149. Since drum 173 does not rotate and rod 158 is rotated with sprocket wheel 140 in annular rings 162 and 163, cam roller 183 follows cam groove 181, causing rod 158 to reciprocate back and forth once on each revolution of sprocket wheel 140. Reciprocation of rod 158, of course, reciprocates spring release 153 so that cutter blade 149 is pivoted and passes between linking bars 136 and 137, severing the casing between the sausages as they pass around cutter wheel 132. If for any reason, conveyor 130 gets out of synchronization with cutter wheel 132, so that cutter blade 149 strikes one of the bars 136 or 137, the spring clip 155 bends and disengages the rounded node 159 from channel 151 of link 150. Rod 158 is thus disengaged from cutter arm 148 and cutter blade 149 falls back until cutter arm 147 strikes a cutter stop 194 affixed to crossbar 143. On further rotation of cutter wheel 132, rod 158 moves back and spring clip 153 strikes the tapered edge 152 of link 150, re-engaging rod 158 with cutter arm 148. On normal operation, rod 158 pivots cutter blade 149 between linking bars 136 and 137 and back to the position shown in FIG. 7 once on each revolution of cuter wheel 132.

Referring to FIG. 6, as the sausages are cut from conveyor 130, they drop on the second conveyor 133. Conveyor 133 is comprised of three sprocket wheels 195, 196, and 197. The sprocket wheels 195, 196, and 197 are fixedly mounted of axles 199—199. A number of sprocket wheels may be mounted parallel to each other on each axle to form a plurality of conveyors 133 parallel to each other to accommodate a number of strings of sausages being cut from their casing simultaneously on cutter wheel 132. Axles 199—199 are rotatably mounted in pillow blocks 200 which are in turn fixedly mounted by suitable means such as bolts 201 to a frame 202. Roller chain 206 is suspended over sprocket wheels 195, 196, and 197. A plurality of receptacles or teeth 207 are fixed to the links of roller chain 206. The teeth 207 (shown in FIG. 9) are preferably made of a pliable material, such as rubber, and are provided with a concave surface 209 shaped to conform to the sausage 135 so that the sausage can be readily transported on the conveyor 133 and will not roll off. The sides of the rubber teeth are extended and are provided with holes 210, so that they can be readily attached to the roller chain links.

The conveyor 133 may be driven by suitable rotating power means 203 connected to one of the axles 199 by means of pulley 204, belt 205 and pulley 208. The conveyor 133 is driven at a more rapid rate than the conveyor 130 so that as the sausages 135—135 are cut apart and drop onto the conveyor 133 they are spaced on conveyor 133 a few links apart.

As the sausages 135—135 pass over sprocket wheel 197, they slip from conveyor 133 and drop into a chute 215 having the shape of a half cylinder. A deflector 216 is provided to aid in guiding the sausages into one end of the chute 215. At the opposite end of the chute 215 are two elongated rollers 217 and 218 that rotate rapidly so that the end of the casing is caught and pulled from the sausage 135 rather quickly. A plurality of chutes 215 may be provided (one for each conveyor 133), spaced along the line of contact of the rollers 217 and 218. On each side of the chute 215, rods 219 are provided to prevent the sausage 135 from falling flat and lodging between the rollers 217 and 218. A small tube 220 is attached to the chute 215 located at a height that is slightly less than that of a sausage 135 lying in the chute 215 with its end in contact with the rollers 217 and 218. A jet of pressurized air is supplied to the chute 215 through a hose 221 attached to the tube 220. The sausage has a tendency to hold to the cylindrical shape of the chute 215 as it slides down the chute 215 to the rollers 217 and 218; however, when the tapered end of the sausage 135 is adjacent to the opening of the tube 220, the jet of air blows the sausage from the chute 215 so that when the jet of air contacts the end of the sausage, the end of the sausage is forced from the chute. Thus the casing is pulled rapidly from the sausage and very shortly thereafter the sausage is forced end-over-end away from the rollers, the total time of which is a fraction of a second. The rollers may be rotated by suitable means, such as gear box 223, and connected to power means 203.

It can thus be seen that in each of the above described forms of the invention, the line of frankfurters in a length of casing are removed one by one from the casing by providing structure which first cuts a constricted portion of the casing between adjacent frankfurters. Structure is provided in each form for thereafter applying oppositely directed forces directed longitudinally of the casing and the frankfurter enclosed therein so that the casing is removed from the frankfurters one by one in order proceeding from one end of the line. In the form of the invention shown in FIGS. 1–3, cutter 37 cuts casing 19 just in front of the leading end of frankfurter 17, rollers 32—32 enter the constriction 52 of casing 19 and exert a longitudinal force in one direction on frankfurter 17. An oppositely directed force, which restrains the casing and prevents it from traveling with the frankfurter, is applied longitudinally of the casing. This force consists of the frictional force of plate 49, the force of rollers 32—32 on the casing, and the restraining force of the adjacent portion of the casing. In the form of the invention shown in FIGS. 4 and 5, when latch 99 is tripped by cam 118, knife 106 severs the casing at the point of constriction at one end of a frankfurter. The pusher block 117 enters the casing constriction at the opposite end of the frankfurter and applies a force in one direction longitudinally of the frankfurter. The arm 87 exerts a restraining force in the opposite direction on the casing so that it does not travel with the frankfurter as it is being pushed out of the casing by pusher block 117. In the form of the invention shown in FIGS. 6–10, the cutter blade 149 cuts the constricted portions of the casing so that the encased frankfurters proceed one by one in order from the end of a line to positions in which each frankfurter is engaged at one end by rollers 217 and 218. The rollers grip the cut casing and exert a force on the casing in one direction longitudinally of the casing so as to pull it off the frankfurter. The closely spaced rollers 217 and 218 exert an oppositely directed force on the frankfurter which prevents it from traveling with the frankfurter during removal.

It will be understood, of course, that, while the forms of the invention herein shown and described, constitute preferred embodiments of the invention, it is not intended to illustrate all the possible forms and ramifications of the invention. It will be also understood that the words used are words of description rather than words of limitation, and various changes, such as changes in shape, size, and arrangement of parts may be substituted without departing from the spirit and scope of the invention herein disclosed.

What is claimed is:

1. A device for removing the casing from link sausages comprising: cutter means for partially severing the casing at one end of each sausage, means for pulling the said partially severed casing from the casing, and roller means for squeezing the casing to expel said sausage.

2. A device for removing the casing from link sausages comprising: cutter means for partially severing the casing at one end of each sausage, a metal plate on said cutter to frictionally pull said partially severed end from the casing and roller means for progressively squeezing the casing longitudinally beginning at the opposite end of said sausage.

3. A device for removing the casing from link sausages comprising: a stripper plate, a plurality of disks, a plurality of rollers mounted on said disks adapted to roll upon the surface of said stripper plate, a cutter supported by said disks adapted to precede and cut off a sausage casing immediately prior to the sausage being squeezed out by said rollers.

4. A device for removing the casings from link sausages including a frame, a stripper and cut-off assembly rotatably mounted on a shaft supported in said frame, and a plurality of stripper plates rigidly mounted on said frame, said assembly comprising: a plurality of disks attached to said shaft; a plurality of rollers mounted on said disks adapted to roll upon the surface of said stripper plates; a plurality of cutters supported by said disks; springs attached to said cutters urging said cutters away from the center of said shaft; said cutters and said rollers so arranged that a cutter cuts the casing near one end of the link of sausage as the rollers press into the constriction at the opposite end of the sausage.

5. A device for removing the casings from link sausages including a frame, a stripper and cut-off assembly rotatably mounted on a shaft supported in said frame, and a stripper plate rigidly mounted on said frame, said assembly comprising: a plurality of disks attached to said shaft; each of said disks having a plurality of projecting arms; rollers mounted in slots at the extremities of said projecting arms; first cam followers attached to said rollers; a cam fixedly attached to said frame having an internal cam surface and an external cam surface; said external cam surface in contact with said first cam followers, allowing said rollers to follow a linear path along said stripper plate; a cutter pivotally mounted at the extremities of each of said projecting arm; second cam followers attached to said cutter; said internal cam surface in contact with said second cam followers and shaped to allow said cutter to strike said stripper plate; said cutter adapted to precede and cut off a sausage casing immediately prior to the sausage being squeezed out by said rollers.

6. A device for removing the casings from link sausages including a frame, a stripper and cut off assembly rotatably mounted on a shaft supported in said frame, and a stripper plate rigidly mounted on said frame; said assembly comprising: at least two disks attached to said shaft; each of said disks having at least two projecting arms; rollers mounted in slots at the extremities of said projecting arms; said rollers free to rotate and move radially in said slots toward and away from the center of said shaft; first cam followers attached to said rollers; a cam fixedly connected to said frame having an external cam surface of substantially circular configuration in intimate contact with said first cam followers, said external cam surface allowing said rollers to follow a circular path during one part of one revolution of said projecting arms and a linear path along said stripper plate during the remainder of the revolution of said arms; a cutter pivotally mounted at the extremities of each of said projecting arms and free to move radially toward and away from the center of said shaft; second cam followers attached to said cutter; an internal cam surface fixedly connected to said frame in intimate contact with said second cam followers and shaped to allow said cutter to move rapidly against said stripper plate once in each revolution of said projecting arms; springs attached to said cutter urging said cutter, away from the center of said shaft; said stripper plate receiving the link sausage in the casing longitudinally aligned with the plane of the cutters and exposing the casing to the action of the cutters under control of the external cam surface as a first operation and immediately following this exposing the casing to the operation of the roller to expel the sausage.

7. For use with a length of tubular casing which is constricted at substantially equally spaced points along its length and encloses a plurality of frankfurters which are arranged end to end in a line and each of which is located between adjacent constricted portions of the casing; apparatus for removing said frankfurters one by one from said casing comprising means for cutting said constricted casing portions, and means for thereafter consecutively applying oppositely directed forces directed longitudinally of said casing and said frankfurters to said casing and to each of said frankfurters in order proceeding from one end of said line so as to remove said casing from said frankfurters.

8. Apparatus for removing the casing from frankfurters and the like in the making of skinless frankfurters from a length of tubular casing which is constricted at substantially equally spaced points along its length to divide it into tubular sections of substantially equal length arranged end to end in a line and each of which encloses a skinless frankfurter located between adjacent constricted portions of the casing; apparatus for removing said frankfurters one by one from said casing comprising knife means for cutting only said constricted portions of the casing, and means for consecutively applying oppositely directed forces directed longitudinally of each of said casing sections and the frankfurter therein proceeding from one end of said line, said forces being directed so that each skinless frankfurter is expelled from its enclosing casing section through the cut constricted casing portion at one end thereof.

9. For use with a length of tubular flexible casing having substantially equally spaced longitudinal portions thereof crimped to divide said casing into a plurality of end to end sections arranged in a line and each of which encloses a frankfurter; apparatus for removing the casing section from each of said frankfurters comprising means for cutting the crimped portions of said casing only at one end of each of said sections, and means for applying opposite forces directed lengthwise of said casing and frankfurters to a particular end of each of said casing sections and the frankfurter end at said particular end of said casing section so as to expel each frankfurter from the cut end of the enclosing section therefor.

10. For use with a length of tubular flexible casing having substantially equally spaced longitudinal portions thereof crimped to divide said casing into a plurality of end to end sections arranged in a line and each of which encloses a frankfurter; apparatus for removing the casing section from each of said frankfurters comprising means for cutting the crimped portions of said casing at one end of each of said sections, and means for applying opposite forces directed lengthwise of said casing and frankfurters to the opposite end of each of said casing sections and the frankfurter end at the opposite end of said casing section so as to expel each frankfurter from the cut end of the enclosing section therefor.

11. Apparatus for separating the enclosing section of a continuous casing from a frankfurter therein in which a plurality of said casing sections, each enclosing a frankfurter therein, are formed integral and arranged end to end in a line; said apparatus comprising means for cutting said casing at a position adjacent the end of the endmost frankfurter in said line remote from the next adjacent frankfurter so as to form an opening in said casing, means for subsequently applying forces to said endmost frankfurter at the end thereof closest to the next adjacent frankfurter in said line directed so as to move said endmost frankfurter through said opening, similarly cutting said casing at a position between said endmost and next adjacent frankfurters to form a second opening in said casing, and means for subsequently applying forces to said next adjacent frankfurter at the end thereof remote from said endmost frankfurter directed so as to move said next adjacent frankfurter through said second opening.

12. For use with a length of tubular flexible casing having substantially equally spaced longitudinal portions thereof crimped to divide said casing into a plurality of end to end sections arranged in a line and each of which encloses a frankfurter; apparatus for removing the casing section from each of said frankfurters comprising means for cutting the crimped portions of said casing at one end of each of said sections, means for applying squeezing forces to the opposite end of said casing, and means for moving said squeezing forces toward the cut end of each section so as to expel the frankfurter therein therefrom.

13. Apparatus according to claim 7 further including: a frame, a first conveyor mounted on said frame; a plurality of peeler blocks supported by said first conveyor, each of said peeler blocks including a front cross bar, an arm pivotally supported to pivot in a plane perpendicular to the direction of movement of said conveyor and urged by resilient means to press upon said front cross bar, said means for cutting said constricted casing portions comprising a knife pivotally supported for rotation in a plane perpendicular to the direction of movement of said conveyor, said knife having a flange and urged by resilient means toward said cross bar so that said flange engages said arm, a knife latch to engage said knife retaining said knife at a position away from said cross bar; a cam supported by said frame positioned in the path of said conveyor shaped to engage said arm and pivot said arm and said knife away from said cross bar to a point where said latch engages said knife, said cam then releasing said arm to fall between the adjacent ends of said frankfurters holding said casing against said front cross bar; a saddle-shaped rear cross bar on said peeler block to maintain said adjacent ends of said frankfurters in spaced relationship; a knife trip cam in the path of said first conveyor positioned to strike said latch releasing said knife to cut said casing between said adjacent ends of said frankfurters; a second conveyor mounted on said frame oppositely disposed to said first conveyor moving at a faster rate in the same direction as said first conveyor; and a pusher block supported by said second conveyor positioned to press between said adjacent ends of said frankfurters to progressively squeeze one of said frankfurters from said casing in the same direction as the movement of said conveyors.

14. Apparatus for removing the casing from frankfurters and the like in the making of skinless frankfurters from a length of tubular casing which is constricted at substantially equally spaced points along its length to divide it into tubular sections of substantially equal length arranged end to end in a line and each of which encloses a skinless frankfurter located between adjacent constricted portions of the casing; apparatus for removing said frankfurters one by one from said casing comprising knife means for cutting only said constricted portions of the casing, and means for consecutively applying oppositely directed forces directed longitudinally of each of said casing sections and the frankfurter therein proceeding from one end of said line, said forces being directed so that each skinless frankfurter is expelled from its enclosing casing section through the cut constricted casing portion at one end thereof, said last mentioned means including a pair of side-by-side rollers, means for rotating said rollers in opposite directions so that on one side the outer surfaces of said rollers are moving toward each other, and means for feeding each skinless frankfurter in its enclosing casing section in an endwise direction into engagement with said roller surfaces on said one side of said rollers so that said casing section is gripped between said rollers and withdrawn from said frankfurter.

15. Apparatus for removing the casing from frankfurters and the like in the making of skinless frankfurters from a length of tubular casing which is constricted at substantially equally spaced points along its length to divide it into tubular sections of substantially equal length arranged end to end in a line and each of which encloses a skinless frankfurter located between adjacent constricted portions of the casing; apparatus for removing said frankfurters one by one from said casing comprising knife means for cutting only said constricted portions of the casing, and means for consecutively applying oppositely directed forces directed longitudinally of each of said casing sections and the frankfurter therein proceeding from one end of said line, said forces being directed so that each skinless frankfurter is expelled from its enclosing casing section through the cut constricted casing portion at one end thereof, said last mentioned means including a pair of rollers, means for rotating said rollers in opposite directions so that the top sides of said rollers are moving toward each other, and chute means for feeding each skinless frankfurter in its enclosing casing section downwardly to an upright position in engagement with the top sides of said rollers so that one end of said casing section is gripped between said rollers to withdraw said casing section from said frankfurter.

16. Apparatus for removing the casing from frankfurters and the like in the making of skinless frankfurters from a length of tubular casing which is constricted at substantially equally spaced points along its length to divide it into tubular sections of substantially equal length arranged end to end in a line and each of which encloses a skinless frankfurter, located between adjacent constricted portions of the casing; apparatus for removing said frankfurters one by one from said casing comprising knife means for cutting only said constricted portions of the casing, and means for consecutively applying oppositely directed forces directed longitudinally of each of said casing sections and the frankfurter therein proceeding from one end of said line, said forces being directed so that each skinless frankfurter is expelled from its enclosing casing section through the cut constricted casing portion at one end thereof, said last mentioned means including a pair of side-by-side rollers, means for rotating said rollers in opposite directions so that on one side the outer surfaces of said rollers are moving toward each other means for feeding each skinless frankfurter in its enclosing casing section in an endwise direction into engagement with said roller surfaces on said one side of said rollers so that said casing section is gripped between said rollers and withdrawn from said frankfurter, and means providing an air jet directed transversely of said frankfurter for moving said frankfurter out of said upright position in engagement with the top side of said rollers.

References Cited in the file of this patent

UNITED STATES PATENTS

| | | |
|---|---|---|
| 2,369,360 | Martin | Feb. 13, 1945 |
| 2,434,316 | Golden et al. | Jan. 13, 1948 |
| 2,644,982 | Schneider | July 14, 1953 |
| 2,660,754 | Roshko | Dec. 1, 1953 |
| 2,672,649 | Demarest et al. | Mar. 23, 1954 |
| 2,730,754 | Schneider | Jan. 17, 1956 |
| 2,799,892 | Demarest et al. | July 23, 1957 |
| 2,954,579 | Menghini | Oct. 4, 1960 |

FOREIGN PATENTS

| | | |
|---|---|---|
| 22,086 | Great Britain | 1913 |